United States Patent [19]

Snyder et al.

[11] Patent Number: 4,902,655

[45] Date of Patent: Feb. 20, 1990

[54] PREPARATION OF PRECURSORS FOR YTTRIUM-CONTAINING ADVANCED CERAMICS

[75] Inventors: Thomas S. Snyder, Oakmont; Richard A. Stolz, Murrysville, both of Pa.

[73] Assignee: Westinghouse Electric Corp., Pittsburgh, Pa.

[21] Appl. No.: 121,012

[22] Filed: Nov. 16, 1987

[51] Int. Cl.$^4$ .............................................. C01F 7/00
[52] U.S. Cl. ...................... 501/152; 423/21.1; 423/263; 423/593; 505/1; 252/500; 252/518; 252/521
[58] Field of Search ............... 423/593, 21.1, 21.3, 423/263; 505/809, 810, 811, 816, 818, 819, 1; 252/500, 518, 521; 535/15; 427/45, 1, 55, 62, 63, 419.2, 419.3, 419.4, 419.6; 501/12, 154, 152

[56] References Cited

U.S. PATENT DOCUMENTS

| | | | |
|---|---|---|---|
| 3,895,097 | 7/1975 | Langenhoff | 423/341 |
| 3,941,719 | 3/1976 | Yoldas | 252/463 |
| 4,208,475 | 6/1980 | Paruso | 429/193 |
| 4,225,635 | 9/1980 | Yoldas | 427/106 |
| 4,244,935 | 1/1981 | Dell | 423/491 |
| 4,346,131 | 8/1982 | Yoldas | 428/35 |
| 4,472,510 | 9/1984 | January | 501/12 |
| 4,507,254 | 3/1985 | Ozaki | 260/429.2 |
| 4,535,026 | 8/1985 | Yoldas | 428/310.5 |
| 4,650,652 | 3/1987 | Naitou | 423/21.1 |
| 4,670,573 | 6/1987 | Greco | 556/182 |

OTHER PUBLICATIONS

Tsukuma, "Mechanical Properties and Thermal Stability of CeO Containing Tetragonal Zirconia Polycrystals" American Ceramic Society Bulletin (vol. 65, No. 10, 1986, pp. 1386-1389).

Primary Examiner—Robert L. Stoll

[57] ABSTRACT

This is a process for making precursors for tetragonally stabilized ceramic. It utilizes fluidized bed chlorination of a rare earth ore (e.g. xenotime or monazite) a separation of yttrium chloride by-product by differential condensation at 725–1200C and reaction of the yttrium-depleted blend of earth chlorides with an alkali metal alkoxide to produce a blend of rare earth alkoxides for mixing with alkoxide of zirconium and/or hafnium producing an alkoxide composite for polymerizing and processing into the ceramic.

7 Claims, 1 Drawing Sheet

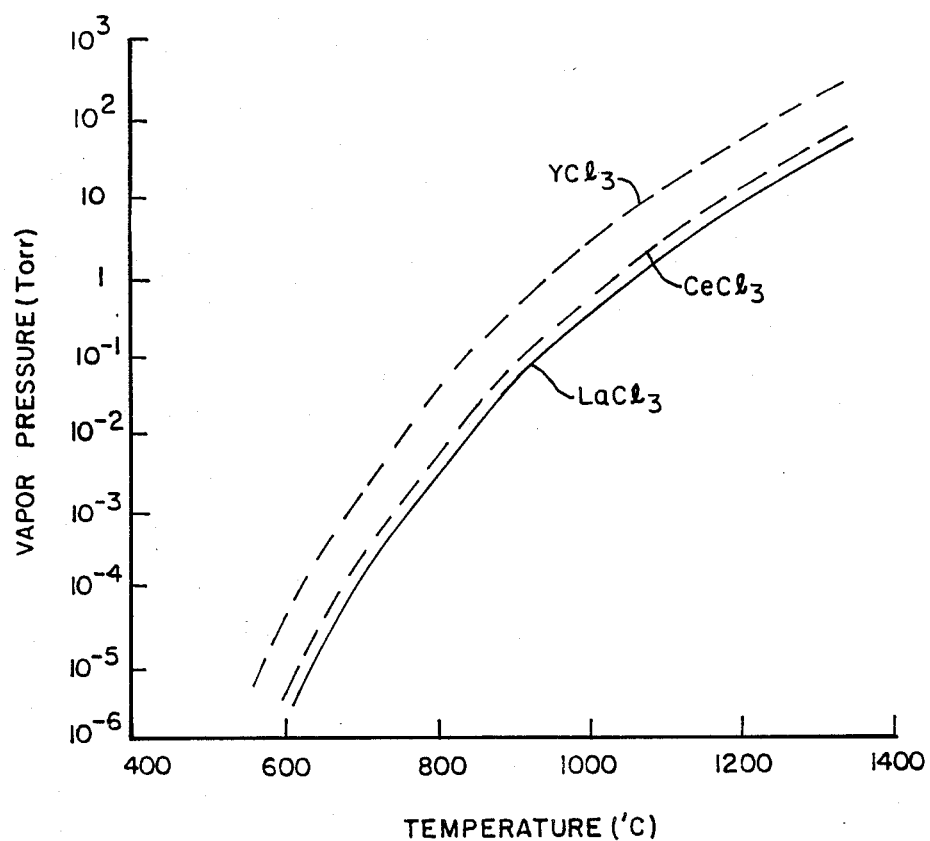

PREPARATION OF PRECURSORS FOR YTTRIUM-CONTAINING ADVANCED CERAMICS

CROSS-REFERENCE TO RELATED APPLICATIONS

Copending application Ser. No. 121,013 filed Nov. 16, 1987 teaches the suspension of single-crystal grains of superconductive oxide in an alkoxide gel, where the alkoxide gel contains non-oxygen constituents of the superconductor, aligning the single crystal grains of oxide superconductor, and curing the gel in an oxidizing atmosphere to form an essentially single-crystal ceramic superconductor.

Copending application Ser. No. 121,016, filed Nov. 16, 1987, teaches a fabrication process to convert rare earth ores into metal alkoxide precursors for ceramic superconductors. It utilizes fluidized bed chlorination of a rare earth ore followed by separation of yttrium chloride with the remaining rare earth mixture being a byproduct. The yttrium is processed into an alkoxide and blended with other alkoxides for fabrication of a superconductor.

Copending application Ser. No. 1212,010 filed Nov. 16, 1987 teaches making single-crystal superconductive oxide from an alkoxide gel, where the alkoxide gel contains non-oxygen constituents of the superconductor, contacting the gel with a single crystal substrate, and curing the gel starting at the gel substrate interface to form an essentially single-crystal ceramic superconductor.

The preceding applications are all assigned to the same assignee and are all hereby incorporated by reference.

BACKGROUND OF THE INVENTION

1. Field of the Invention

This invention relates to advanced ceramics, and in particular to a process utilizing fluidized bed chlorination to extract rare earth values from ore and the preparation of alkoxide precursors for the fabrication of such ceramics.

2. Description of Related Art

Doping of zirconia to provide a stabilized ceramic (either partially or fully) is well known, and generally required to avoid dimension problems due to phase changes with temperature, as pure zirconia is monoclinic below 1000° C. and cubic above. Stabilization to the cubic phase has been provided by various oxides, particularly of 6–12% of rare earth, (especially yttrium) or by a somewhat larger percentage of calcium or magnesium. Rare earth stabilization to a tetragonal phase is also known. In an article entitled "Mechanical Properties and Thermal Stability of CeO Containing Tetragonal Zirconia Polycrystals" in the American Ceramic Society Bulletin (Vol. 65, No. 10, 1986, pp. 1386–1389) Tsukuma notes that about 10–16% cerium oxide, possibly with a small amount of Lanthanum and neodymium oxide, provided better stabilization to the tetragonal phase than yttrium oxide.

Generally ceramics are prepared from pressed powder, typically from mixed powders of the individual oxides (e.g. a mix of zirconium oxide and yttrium oxide powders) with the mix being milled and fired to provide a sintered ceramic. While alkoxide mixes have been experimentally cured and calcined to produce ceramics, difficulties have been incured due to trapped curing by-products and further, such a process has generally been considered too expensive for commercial production. Precipitation from a chloride solution followed by calcination has also been used to produce a powder for pressing, and a much more homogeneous product is produced.

Naitou et al. in U.S. Pat. No. 4,650,652, issued Mar. 7, 1987, relates to a process for recovering high purity rare earth oxides from a waste rare earth phosphor. The process utilizes dissolving waste rare earth phosphor in an excess amount of acid, adding oxalic acid to obtain precipitates of rare earth oxylates, washing precipitates and baking precipitates.

Ozaki et al, in U.S. Pat. No. 4,507,254, issued Mar. 26, 1985, relates production of a rare earth metal alkoxide by reacting a rare earth metal carboxylate with an alkali metal alkoxide in an inert organic solvent to liquid under anhydrous conditions.

U.S. Pat. No. 4,244,935, issued to Dell on Jan. 13, 1981, relates a method of forming the chloride of a metal-oxygen containing substance based on a fluid coking technique. It should be noted that the commercial process for making zirconium metal utilizes a fluidized bed process in which the ore is subjected to a chlorination step which produces a relatively impure, hafnium-containing zirconium tetrachloride and by-product silicon tetrachloride (which by-product is relatively easily separated by differential condensation). U.S. Pat. No. 3,895,097, issued to Langenhoff et al. on July 15, 1975, also relates to a process for reacting metal oxides with chlorine.

U.S. Pat. No. 4,670,573, issued to Greco et al. on June 2, 1987, relates to the preparation of metal alkoxides from metals and alcohols. The description of the prior art lists references that relate to the reaction of metals with alcohol to form metal alkoxides. Kirk-Othmer also discusses metal oxides of higher, unsaturated, or branched alcohols made from lower metal alkoxides on page 1, lines 25–50.

U.S. Pat. No. 4,472,510, issued to January on Sept. 18, 1984, relates to a process of making glassy ceramics, including a method of preparing a carbon-containing monolithic glassy ceramic including a metal alkoxide which hydrolyzes and polymerizes in the presence of water.

SUMMARY OF THE INVENTION

This is a process for extracting an yttrium by-product from a rare earth ore while using the non-yttrium component to prepare a composite for use in the fabrication of a ceramic. This process utilizes feeding a rare earth ore (which may have been concentrated by known, leaching processes), to a fluidized bed chlorinator at 800°–1250° C. to produce yttrium chloride and chlorides of other rare earths contained in the ore, separating the yttrium chloride by differential condensation at 725°–1200° C. (preferably refluxed at 900°–1100° C.) from the blend of yttrium-depleted rare earth chlorides, anhydrously reacting the separated blend of yttrium-depleted rare earth chloride with at least one alkoxide selected from the group consisting of the alkali metal alkoxides (preferably sodium alkoxide, especially $NaOCH_3$, $NaOC_2H_5$, $NaOC_3H_7$, $NaOC_4H_9$ or $NaOC_5H_{11}$) to produce alkoxide, separating the alkoxide from the reaction by-products and excess reagents, and mixing the alkoxide with alkoxides of zirconium, hafnium or mixtures thereof to produce an alkoxide composite for further processing into a ceramic.

Preferably, the separating of the blend of yttrium-depleted rare earth alkoxide from reaction by-products and excess reagents is performed by evaporative crystallization followed by a distillative purification. Generally, the alkoxide reactant has 1-5 carbon atoms, and preferably one to two carbon atoms.

The utilization of alkoxides provides for extremely homogeneous ceramics. The process also is cost effective due to the relatively low processing temperature and high value yttrium by-product.

BRIEF DESCRIPTION OF THE DRAWING

The sole FIGURE is a graph of vapor pressure (in Torr) as a function of temperature for chlorides of yttrium, cerium and lanthanum.

DESCRIPTION OF THE PREFERRED EMBODIMENTS

This invention provides a process for fabrication of precursors of a ceramic. By mixing alkoxides of the non-oxygen constituents, an extremely homogeneous composite is prepared. This allows the final properties to be tailored to provide exacting control of chemical and physical properties. Compared to prior fabrication approaches which used oxide feedstocks, the present process had the advantages of achieving chemical homogeneity, and providing easy formation using liquid polymers. The physical homogeneity in the matrix translates directly to improved microstructure of the product. The milling and blending steps required for prior art powders, with their inherent introduction of contaminants, are eliminated. It should be noted that the term "rare earth", as used herein, includes yttrium.

It should be noted that the alkoxide processing provides a degree of homogeneity that is generally not achievable in other processes. Processes which mix and mill oxides and/or carbonates of the individual component metals do not produce the homogenous mixing which is produced when compounds of the component metals are in solution. Most processes for obtaining solids out of solution, however, utilize some type of precipitation, which tends to precipitate different components at different rates, which results in a varying liquid composition as the precipitation proceeds, resulting in a varying composition of the precipitate. This alkoxide process, however, polymerizes, from solution, the mixed proceed uniformity, and solvent and volatiles concentrations may not be uniform during curing, this process maintains the metallic constituents in a homogeneous, constant molar relationship therefore produces a homogeneous final product. Thus it is important in this alkoxide process that premature evaporation of the solvent before polymerization, and thus evaporative crystallization, be avoided.

The ceramic may be zirconia or hafnia, but typically has the 98% zirconia-2% hafnia ratio generally found in zircon ores. It is felt that the use of homogeneous blend of rare earth provides superior tetragonal stabilization of such ceramics, with the yttrium-depleted, but otherwise natural occurring blend of rare earths being both cheaper and superior to, for example, the aforementioned Ce or Ce with a small amount of La and Nd of Tsukuma.

For ceramic materials, superior product performance is obtained where metal alkoxide precursors are used as process feedstocks. This product performance stems from the precise control of chemical composition, chemical homogeneity, and improved microstructure available with the alkoxide feedstocks, but not from the oxide feedstocks normally utilized. The high cost of alkoxide materials, has in the past, been a major impediment to wide spread application. The present invention integrates relatively low temperature chlorination technology to generate the required alkoxide feed stocks with high value by-product production to provide cost effective metal alkoxide production. The process accepts the rare earth ores (e.g. xenotime or monazite). It generally utilizes fluidized bed chlorination of the ore (or of an ore concentrate produced by leaching of the ore) mixed with carbon, at about 800°-1250° C., with chlorine gas providing both chlorination and, together with an inert gas, fluidization (generally similar to the known process for chlorinating zirconium ore) to produce rare earth chlorides. The yttrium chloride is separated from the other rare earth chlorides by differential condensation at 725°-1200° C. (and preferably reflux condensation at 900°-1100° C.). It should be noted that the boiling point of yttrium chloride is 1507° C. and that the boiling points of the other rare earths are a little over 1700° C. and that while chlorination and condensing the other rare earths (with the yttrium remaining vapor and being condensed separately later) at 1550° C. or 1600° C. is theoretically possible, such extremely high temperatures are impractical for commercial production. This invention avoids such temperatures by operating both chlorination and differential condensation below the rare earth chloride boiling points at relatively low partial pressures (see the sole figure, the vapor pressures of the remaining rare earth chloride are not shown, but are similar to those of the chlorides of cerium and lanthanum) and generally uses an inert gas to give a total system operating pressures of about one atmosphere. It preferably uses a reflux condenser to improve separation condensing the other rare earth chlorides first and separately condensing the yttrium chloride downstream. The vapor from a 950° C. chlorinator can be introduced near the bottom of a reflux condensor, with the condenser operated, e.g. at about 900° C. with a reflux reboiler on the bottom operated at 1000° C., such that the reboiler receives condensate liquid from the condenser and vaporizes and refluxes most of the condensate, thus improving separation. Refluxing is required to obtain reasonable yttrium by-product from monazite ore which contains only about 2.1% of the total lanthanon oxide as yttria, and preferred for ores such as xenotime (which contains about 60.8% of the lanthanon oxide as yttria). It should be noted that the other rare earths are not separated from one another by the process of this invention, and the product contains mixed rare earth oxides, depleted in yttrium.

The yttrium-depleted, blend of rare earth chlorides is then reacted, generally with sodium alkoxide (e.g. NaOCH$_3$), to produce rare earth alkoxide (e.g. RE-(OCH$_3$)$_3$). By utilizing the chloride reaction with sodium alkoxide, rare earth alkoxide is directly produced, with the reaction going to completion, avoiding the use of high temperatures and pressures and/or expensive catalyst. Alkoxide is then preferably crystallized, by evaporation off (and recycling) excess reagent. The rare earth alkoxide may then be separated from by-product salt (e.g. sodium chloride) by heating to distill off the alkoxide. A zirconium alkoxide can be similarly formed by reacting the chloride with sodium alkoxide. The purified blend of rare earth alkoxide can then be blended with other alkoxide (e.g. zirconium alkoxide) to form a composite which may be gelled and eventually oxidized to produce the ceramic.

This process provides for mixing on an atomic level and provides, at a reasonable cost, a homogeneous product which cannot be obtained by the prior art powder processes which utilize milling of powders of the separate oxides. The prior art processes, even with many cycles of grinding, firing, regrinding, refiring, etc., do not achieve mixing on an atomic level and inherently produce an inhomogeneous product. Applicants' invention, utilizing alkoxides produces a true solution and mixing of the (generally metallic), non-oxygen components on an atomic basis.

The process is broadly applicable to tetragonally stabilized zirconium and/or hafnium ceramic. Thus the feed mixture for a gel may consist of stoichiometric amounts of alkoxides. The alcohol moieties on the feed stock alkoxides are selected to establish the desired microstructure and physical properties of the products, but in general are preferred to be $C_1$ through $C_5$ (and especially $C_1$ and $C_2$ as they require less oxygen during curing to the oxide) aliphatic chains. Table 1 below shows a procedure for forming an alkoxide gel.

TABLE 1

40-60 volume % metal zirconium alkoxide and/or hafnium alkoxide
30-45 volume % ethanol or other alcohol ($C_1$-$C_5$)
5-15 volume % water
Alternatively other alcohol/metal alkoxide combinations can be used. The reaction mix may be polymerized in an exothermic reaction at the alcohol normal boiling point of 78.4 C under reflux. The actual volume percent composition of the reaction mix can vary considerably.

SPECIFIC RECIPE AND PROCEDURE

|  | Preferred | Range |
|---|---|---|
| Deionized Water: | 4.4 | 2.3-7.89 |
| 200 Proof Ethanol: | 5.4 | 3-20 moles |
| 70 w/o $HNO_3$: | 10 drops | 10-30 drops |
| Mixed Alkoxides Weighed as Moles of "Metal" | 2.9 moles | 1.8-5 moles |
| Ethanol (200 proof): | 0.1 moles | .08-.5 moles |

1. Clean and dry glass reactor (see tare weight)
2. Weigh in water and ethanol
3. Add nitric acid
4. Mix contents to produce homogeneous mixture
5. Add mixed alkoxides as rapidly as possible
6. Use absolute ethanol to bring weight up to 750 gram
7. Close reactor and agitate
8. Heat under alcohol reflux temperature for at least 16 hours For fabrication of the ceramic of alkoxides are mixed to produce an alkoxide composite. The alkoxide composite is then polymerized to produce an alkoxide gel. It is important for homogenuity that the metal compounds be mixed prior to polymerization and that the polymerization be done before evaporation, for example, causes crystallization. The metallic constituents are to be polymerized from solution, not precipitated. The alkoxide gel is then preferably applied to a support and the gel cured, e.g. by ultraviolet light or firing in a furnace at between 250° C. and 1200° C. in oxidizing atmosphere. Preferably, the curing is done by heating the support and allowing heat from the support to heat the alkoxide gel and with the curing being initiated at the gel-support interface. The surface opposite the support may be cooled while the support is heated during the early phase of the curing in order to encourage curing to start at the support and proceed outward towards the opposite surface of the gel. An intermediate hardening process may be used after the gel is applied to the support but before it is being cured, with the hardening being done, for example, by a limited dosage of ultraviolet light.

Thus, this invention provides a process for extracting an yttrium by-product and blend of yttrium depleted rare earths from a lanthanite ore and using the yttrium depleted rare earths to prepare a composite for use in the fabrication of a ceramic. This process utilizes a fluidized bed chlorinator preferably at 900°-1500° C. to produce by-product yttrium chloride and mixed chlorides of yttrium-depleted blend of rare earths, separating the yttrium chloride from the other rare earth chlorides by differential condensation at 725°-1200° C., anhydrously reacting the yttrium chloride with preferably sodium methyl alkoxide, this producing a blend of rare earth methyl alkoxides, and mixing the blend of rare earth alkoxides with zirconium and/or hafnium alkoxide and polymerizing the alkoxide composite without allowing any precipitation in the composite.

The invention is not to be construed as limited to the particular examples described herein, as these are to be regarded as illustrative, rather than restrictive. The invention is intended to cover all processes which do not depart from the spirit and scope of the invention.

We claim:

1. A process for extracting a blend of rare earths for components of a ceramics principally comprising at least one of zirconia or hafnium from a rare earth ore containing rare earth values and using said blend or rare earths in preparing a composite for use in fabrication of an ceramics containing oxides of the blend of rare earths, said process comprising:
    a. feeding at least a portion of the rare earth ore to a fluidized bed chlorinator at 800°-1250° C. to produce rare earth chlorides from said rare earth values contained in said ore;
    b. separating a blend of yttrium-depleted rare earth chlorides from yttrium chloride by-product, with said yttrium chloride by-product being separated by differential condensation from said blend of rare earth chlorides at 725°-1200° C.;
    c. anhydrously reacting said separated blend of rare earth chlorides with at least one of alkoxide reactant selected from the group consisting of the alkali metal alkoxides to produce blend rare earth alkoxides and separating said blended rare earth alkoxides from reaction by-products and excess reagents;
    d. mixing said rare earth alkoxide with at least one of zirconium and hafnium alkoxide, to produce an alkoxide composite; and
    e. polymerizing and processing said composite into ceramic.

2. The process of claim 1, wherein said separating of said rare earth alkoxide from reaction by-products.

3. The process of claim 1, wherein said alkoxide composite is applied to a support and said composite is cured by heating said support to 250°-1200° C. in an oxidizing atmosphere while cooling said composite.

4. The process of claim 1, wherein said alkoxide composite principally comprises zirconium alkoxide and the alkoxide reactant is sodium alkoxide.

5. The process of claim 1, wherein said rare earth ore is leached prior to fluidized bed chlorination to concentrate the rare earth values.

6. A process for extracting a blend of rare earths from a rare earth ore containing rare earth values and fabrication of a ceramic containing a blend of rare earth oxides and containing zirconium oxide as the principal constituent, said process comprising:

a. utilizing a fluidized bed chlorinator to produce chlorides of yttrium and essentially all other rare earths contained in said ore;
b. separating said chloride of yttrium from said other rare earth chlorides by differential condensation to produce a blend of yttrium-depleted rare earth chlorides, and yttrium chloride by-product;
c. anhydrously reacting said separated yttrium-depleted blend of rare earth chlorides with at least one alkoxide reactant selected from the group consisting of the alkali metal alkoxides to produce an yttrium-depleted blend of rare earth alkoxides and separating said yttrium-depleted blend of rare earth alkoxides from reaction by-products and excess reagents;
d. mixing said yttrium-depleted blend of rare earth alkoxides with a non-rare earth metal alkoxide component, which non-rare earth metal alkoxide component principally comprises zirconium alkoxide; and
e. polymerizing said alkoxide composite and applying said alkoxide composite to a support and curing said composite by heating said support while cooling said composite, thereby producing a homogeneous ceramic.

7. The process of claim 1, wherein said alkali metal alkoxide has 1-5 carbon atoms.

* * * * *